United States Patent
Villeneuve et al.

(10) Patent No.: US 9,047,574 B2
(45) Date of Patent: Jun. 2, 2015

(54) STORAGE CAPACITY PLANNING

(75) Inventors: Ray M. Villeneuve, Atherton, CA (US); Gideon J. Senderov, Cupertino, CA (US); Barry S. Van Hooser, Pleasanton, CA (US); Heidi M. Schoolcraft, San Jose, CA (US); William T. Fuller, Cupertino, CA (US); Michael F. Perka, Mountain View, CA (US); Reece Joyner, San Francisco, CA (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 13/158,204

(22) Filed: Jun. 10, 2011

(65) Prior Publication Data

US 2011/0252134 A1 Oct. 13, 2011

Related U.S. Application Data

(63) Continuation of application No. 11/704,734, filed on Feb. 9, 2007, now abandoned.

(60) Provisional application No. 60/772,280, filed on Feb. 9, 2006.

(51) Int. Cl.
*G06F 12/00* (2006.01)
*G06Q 10/00* (2012.01)
(Continued)

(52) U.S. Cl.
CPC .......... *G06Q 10/00* (2013.01); *G06F 17/30398* (2013.01); *G06Q 10/10* (2013.01); *H04L 41/147* (2013.01); *H04L 67/16* (2013.01); *H04L 67/1097* (2013.01)

(58) Field of Classification Search
CPC ... G06Q 10/04; G06F 17/18; G06F 17/30424; G06F 17/30905; G06F 3/0631; G06F 3/0653; G06F 3/061; G06F 3/067; G06F 11/3409
See application file for complete search history.

(56) References Cited

U.S. PATENT DOCUMENTS

| 5,247,660 A | 9/1993 | Ashcraft et al. |
| 5,659,593 A | 8/1997 | Tzvieli |

(Continued)

FOREIGN PATENT DOCUMENTS

| JP | 03015899 A | 1/1991 |
| JP | 07191978 A | 7/1995 |

(Continued)

OTHER PUBLICATIONS

Gardner, Jr.: "Exponential Smoothing: The State of the Art", 1985, Journal of Forecasting, vol. 4, 28 pages.

(Continued)

*Primary Examiner* — Reginald Bragdon
*Assistant Examiner* — Thanh D Vo
(74) *Attorney, Agent, or Firm* — Winstead PC

(57) ABSTRACT

A system and methods for capacity planning of electronic systems storage are provided. Features include a non-invasive data discovery and collection mechanism, an adaptive grouping mechanism, a flexible analysis mechanism, predictive modeling and forecasting mechanisms, and a business metric and correlation mechanism. A discovery engine that ascertains the availability of collectable entities. A collection engine in turn gathers information from and about entities discovered by the discovery engine. A grouping module groups together entities according to parameters specified by the user. An analysis and forecasting module allows a user to create, modify and save forecast scenarios from which a model is generated by a modeling module. Correlations can be identified between specified key business metrics and historical data. Once a model has been created, a forecast is generated and can then be analyzed using Bold Freehand Extrapolation, time-series analysis, and business trend-based forecasting.

14 Claims, 13 Drawing Sheets

(51) Int. Cl.
*G06F 17/30* (2006.01)
*G06Q 10/10* (2012.01)
*H04L 12/24* (2006.01)
*H04L 29/08* (2006.01)

(56) References Cited

U.S. PATENT DOCUMENTS

| | | | |
|---|---|---|---|
| 5,893,166 | A | 4/1999 | Frank et al. |
| RE36,989 | E | 12/2000 | White |
| 6,185,655 | B1 | 2/2001 | Peping |
| 6,272,612 | B1 | 8/2001 | Bordaz et al. |
| 6,529,877 | B1 | 3/2003 | Murphy et al. |
| 6,636,242 | B2 | 10/2003 | Bowman-Amuah |
| 6,857,012 | B2 | 2/2005 | Sim et al. |
| 7,058,708 | B2 | 6/2006 | Gold et al. |
| 7,080,026 | B2 | 7/2006 | Singh et al. |
| 7,228,354 | B2 | 6/2007 | Chambliss et al. |
| 7,236,940 | B2 | 6/2007 | Chappel |
| 7,251,589 | B1 | 7/2007 | Crowe et al. |
| 7,370,001 | B2 | 5/2008 | Harris |
| 7,584,116 | B2 | 9/2009 | Kakouros et al. |
| 7,610,214 | B1 | 10/2009 | Dwarakanath et al. |
| 7,783,510 | B1 | 8/2010 | Gilgur et al. |
| 7,788,127 | B1 | 8/2010 | Gilgur et al. |
| 7,946,474 | B1 | 5/2011 | Agrawal |
| 7,987,106 | B1 | 7/2011 | Aykin |
| 8,019,801 | B1 * | 9/2011 | Robb et al. .................... 707/899 |
| 8,285,582 | B2 | 10/2012 | Bateni et al. |
| 2002/0147622 | A1 | 10/2002 | Drolet et al. |
| 2002/0156596 | A1 | 10/2002 | Caruso et al. |
| 2002/0174005 | A1 | 11/2002 | Chappel |
| 2002/0194326 | A1 | 12/2002 | Gold et al. |
| 2003/0033398 | A1 | 2/2003 | Carlson et al. |
| 2003/0154271 | A1 | 8/2003 | Baldwin et al. |
| 2004/0236709 | A1 | 11/2004 | Johnson et al. |
| 2005/0021044 | A1 | 1/2005 | Stone et al. |
| 2005/0055603 | A1 | 3/2005 | Soran et al. |
| 2005/0080696 | A1 | 4/2005 | Bagchi et al. |
| 2005/0096964 | A1 | 5/2005 | Tsai |
| 2005/0102175 | A1 | 5/2005 | Dudat et al. |
| 2005/0137835 | A1 | 6/2005 | Moessner |
| 2005/0138020 | A1 | 6/2005 | Lokken |
| 2005/0165635 | A1 | 7/2005 | Moessner |
| 2005/0259683 | A1 | 11/2005 | Bishop et al. |
| 2006/0247859 | A1 | 11/2006 | Ladde et al. |
| 2006/0271422 | A1 | 11/2006 | Rakesh et al. |
| 2007/0198328 | A1 | 8/2007 | Fuller et al. |
| 2007/0198722 | A1 * | 8/2007 | Kottomtharayil et al. .... 709/226 |
| 2007/0265904 | A1 | 11/2007 | Lindquist et al. |
| 2008/0004939 | A1 | 1/2008 | Li et al. |
| 2008/0221974 | A1 | 9/2008 | Gilgur et al. |
| 2008/0256099 | A1 | 10/2008 | Chodorov et al. |

FOREIGN PATENT DOCUMENTS

| | | |
|---|---|---|
| JP | 10078963 A | 3/1998 |
| WO | WO-2007092615 A2 | 8/2007 |
| WO | WO-2008103960 A1 | 8/2008 |

OTHER PUBLICATIONS

International Search Report and Written Opinion issued in PCT/US07/03555 on Feb. 9, 2007 in 7 pages.

"Horizon UI Release 1 GUI External Functional Spec Revision: 1.10", Monosphere, U.S.A., pp. 1-56 (Oct. 4, 2005).

"Storage Horizon™ Systematic Capacity Planning Agent-less Software Solution to Optimally Manage and Plan Storage Growth", Product Brochure in 4 pages, Monosphere, U.S.A. (2005).

"Systematic Storage Capacity Planning the Case for an Ongoing Strategic Planning Process", White Paper, Monosphere, U.S.A., pp. 1-10 (2005).

Storage Horizon™ User's Guide Version 2.1, Monosphere, U.S.A., pp. 1-88 (2005).

International Search Report and Written Opinion PCT/US2008/054802, dated Jun. 27, 2008 in 8 pages.

* cited by examiner

STORAGE CAPACITY PLANNING

CROSS-REFERENCE TO RELATED APPLICATIONS

This application claims the benefit of U.S. Provisional Application Ser. No. 60/772,280, filed on Feb. 9, 2006, which is incorporated by reference herein in its entirety.

BACKGROUND OF THE INVENTION

1. Field of the Invention

The present invention is directed generally to determining machine storage capacity requirements. In particular, the present invention relates to effective management of future storage capacity needs by tracking current and historical usage and utilization, facilitating a better understanding of existing storage usage and utilization, and enabling scenario planning for prediction of future storage requirements.

2. Description of the Related Art

Storage usage in general is growing, and growing rapidly. Applications of all types consume ever-increasing amounts of storage, and the consequences of running out of storage—room for an application to store data—can be catastrophic. At a minimum the application will cease providing some of its functions. In a severe case the application will fail, which may, in turn, cause the associated business functions to fail. Thus, businesses are forced to continually add storage and maintain a safety margin. Yet the costs for storage must be taken into account—additional storage implies additional dollars. A challenge, therefore, is to effectively balance the need for more storage with the need to control costs.

Conventional storage management tools provide a picture of current capacity—what storage is available now, and are there any problems, as defined by user policies, that exist at the moment. Some of these tools may also provide historical logs of the data. These are, by and large, reporting tools, with pre-determined analysis capabilities. They typically collect information through the use of invasive software or other methods that must be permanently loaded on the systems from which the tool collects information. This collected information may be applied against standard or user-defined policies to provide indications of issues or problems that already exist. A user is typically not provided with specific, actionable data that indicates the types of actions that might be required, today, to prevent storage capacity problems in the future.

One conventional approach is the use of basic enterprise management tools such as Unicenter by CA; Tivoli by IBM; and OpenView by Hewlett Packard. While the information gathered by these tools may be broad, they are basic monitoring and reporting tools, limited to providing information about current needs and data.

Another approach involves storage resource management tools, which are narrower in scope than the general enterprise management tools. They provide some basic storage management capabilities, e.g. provisioning, but again, are limited to providing a view of current data only.

Network and processor capacity tools are an additional category of conventional tools in current usage. While they provide capacity information, they are specific to processor and/or network performance and, again, are limited to a current view.

In addition, conventional approaches lack flexible association mechanisms. Current tools enforce pre-defined views of the elements being managed. There is no method by which a user can group or associate items to facilitate additional planning and action.

Current tools provide a fixed set of query capabilities that restrict a user to gaining only the level of understanding that the tool supports. There is a very limited ability, if any, for the user to freely query the tools data to gain information or analysis that is meaningful. Their information basis is limited to technological data and does not take into account business metrics.

Thus, there is a need for an easy-to-use tool that provides users with query-able access to current, historical and predicted data as well as strong analysis and forecasting capabilities, and which is adaptable to specific business metrics.

SUMMARY OF THE INVENTION

The present invention enables methods and systems for capacity management planning of electronic systems storage. Features of the present invention include a non-invasive data discovery and collection mechanism, an adaptive grouping mechanism, a flexible analysis mechanism, predictive modeling and forecasting mechanisms, and a business metric and correlation mechanism.

To facilitate ease of deployment and eliminate the possibility of affecting the systems being measured, a system in accordance with the present invention does not require additional new tools persistently located, or resident on the entities from which data is gathered. And, since each customer's environment is different and changing, an adaptive grouping mechanism is provided that is flexible and can mirror the changing environment of the user.

To help the user achieve a thorough understanding of his environment and a model for its future needs, a flexible query methodology is also provided.

And, because a focus on obtaining information solely from the storage in question does not provide the level of detail nor an understanding of outside influences required to truly forecast needs in electronic storage, a system of the present invention therefore incorporates business level data in conjunction with the storage environment history to provide accurate levels of prediction and forecast.

A system in accordance with an embodiment of the present invention includes a discovery engine that ascertains the availability of collectable entities. A collection engine in turn gathers information from and about entities discovered by the discovery engine. A grouping module groups together entities according to parameters specified by the user. An analysis and forecasting module allows a user to create, modify and save forecast scenarios from which a model is generated by a modeling module. Correlations can be identified between specified key business metrics and historical data. Once a model has been created, a forecast is generated and can then be analyzed using Bold Freehand Extrapolation, time-series analysis, and business trend-based forecasting.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
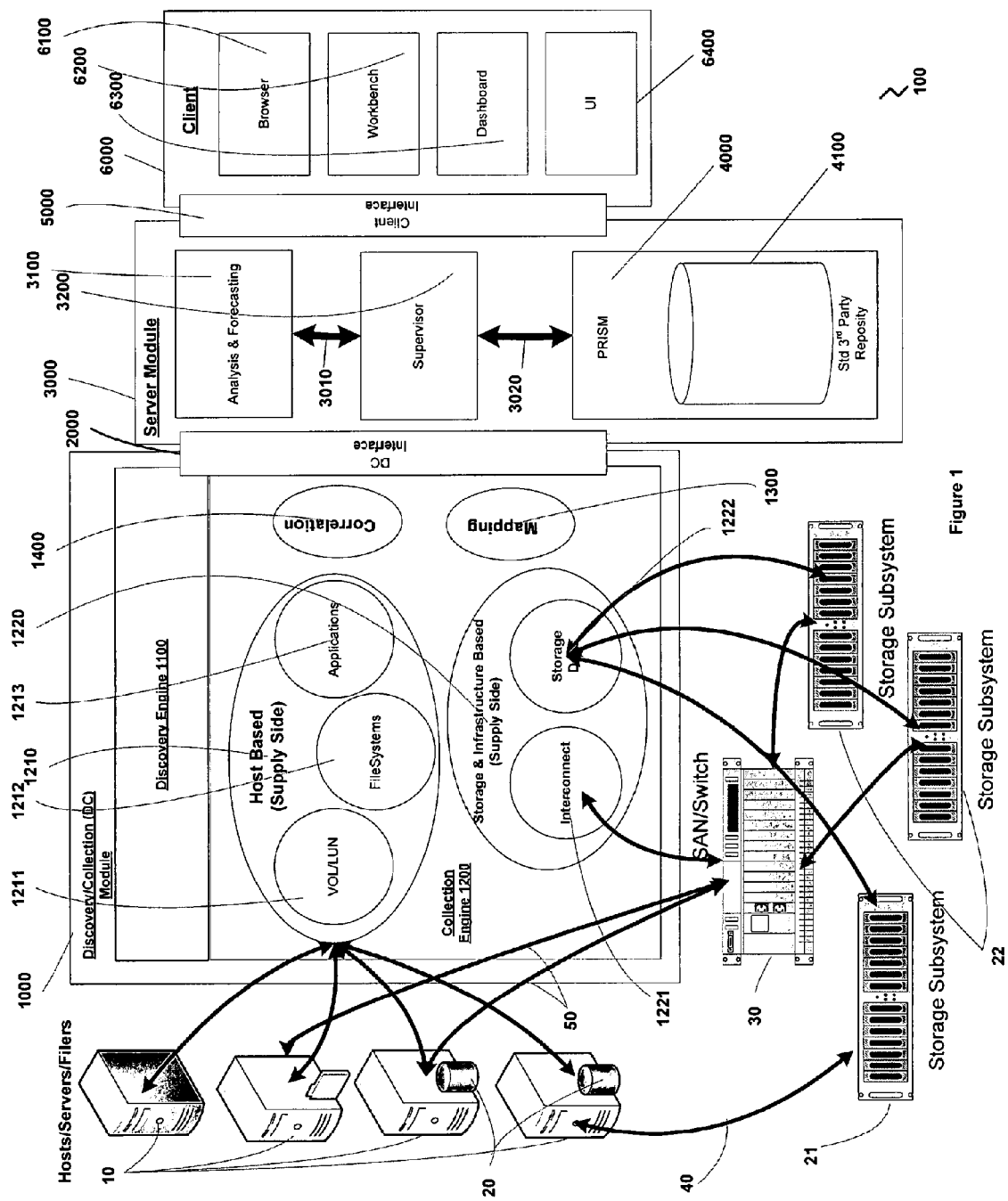
FIG. 1 illustrates a system for providing storage capacity management in accordance with an embodiment of the present invention.

FIG. 1 illustrates a system 100 for providing storage capacity management and planning in accordance with an embodiment of the present invention.

System 100 includes one or more host systems 10. Each host system 10 includes one or more processors and software applications, and one or more local 20 or remote storage elements 21, 22 are connected to host systems 10 directly 21 or indirectly 22 though a switching fabric 30.

System 100 also includes a discovery/collection (DC) module 1000; a server module 3000, including a relational database subsystem, known as a persistent repository with integrated schema mechanism) (PRISM) 4000; and client module 6000.

Server module 3000 interfaces to discovery/collection module 1000 via a DC interface 2000 as well as to the client module 6000 via a client interface 5000.

Discovery/collection module 1000 includes a collection engine 1200 and a discovery engine 1100. Discovery engine 1100 in one embodiment includes industry standard interface protocols, e.g., ICMP/Ping, etc., to ascertain the availability of collectable entities. Collection engine 1200 in turn may include a collector module for hosts 1210 and/or storage and infrastructure subsystems 1220. Host collector modules 1210 gather several sorts of information from the enterprise environment including file systems 1212, applications 1213, volumes and devices 1211. Storage and infrastructure collection modules 1220 include interconnect collectors 1221 and storage device collectors 1222. Each of these collection modules may operate in parallel and independently of the others. Standard IO protocols, including WMI, SSH, SNMP, etc., are used to gather information from relevant entities without requiring invasive software on those entities. The collected data is processed by a correlation engine 1400, which handles a multitude of associations, including the determination of applications to file systems, logical volumes or local devices; and then on to physical device correlations. Both the raw data and the correlated data are then mapped using the data base schema by mapping process 1300.

DC interface 2000 enables the running of multiple DC processes 1000 and the ability to locate them remotely and distinct from each other.

Server module 3000 is a set of processes that perform core services. Server module 3000 includes an analysis and forecasting process 3100, a supervisor 3200 and a relational database schema and interface module (PRISM) 4000. Supervisor 3200 provides basic support and infrastructure functions for system 100. PRISM module 4000 provides views, stored procedures and basic support for a relational database that contains raw and formulated data. Analysis and forecasting engine 3100 contains forecasting and modeling services.

Client interface 5000 provides system 100 with the ability to run multiple client processes 6000, locating them locally on the same system that contains server module 3000 processes, or remotely and distinct from each other.

Client module 6000 includes a browser 6100, a workbench 6200, a dashboard 6300 and UI 6400. Browser 6100 provides a user with several views including various lists of entities that have been collected, associations that have been formed and queries and forecasts that have been generated. Workbench 6200 provides the user basic interaction and manipulation features including those necessary to form associations, set up various forms of user interactions including notifications and tasks, to query the repository, and to create scenarios and models for forecasting and analysis. Dashboard 6300 provides summary information, as chosen by the user, including views of analysis data as well as notification and task data.

Figure 2:
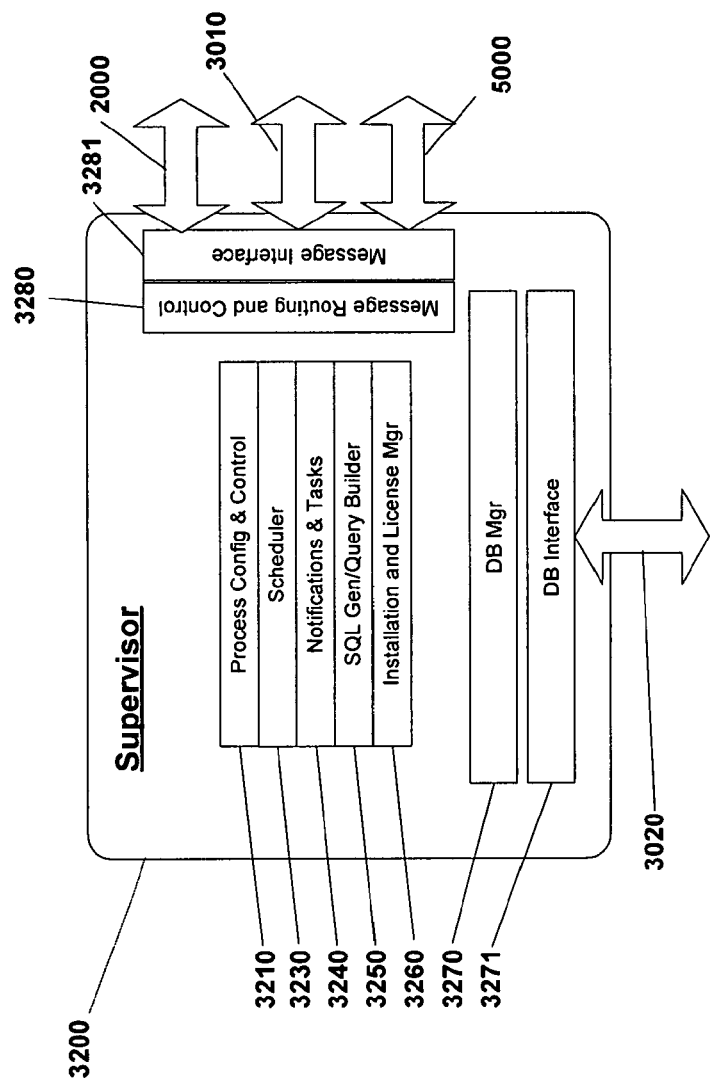
FIG. 2 shows a detailed view of a supervisor module in accordance with an embodiment of the present invention.

FIG. 2 provides a more detailed illustration of components of supervisor process module 3200 in accordance with an embodiment of the present invention. Supervisor 3200 includes several basic services and infrastructure support layers. Supervisor 3200 uses messaging interface layers 3280, 3281 to connect to other aspects of the system. Supervisor message interface 3281 supports both data collection interface 2000 and the client interface 5000, and analysis and forecasting process interface 3010. One service provided by supervisor 3200 is a message router and control service 3280. Message router and control service 3280 parses system messages and routes them to the correct destination, if other than the supervisor. Routing and message control is done in a reliable fashion ensuring both message delivery and a response to the originator.

A process configuration and control 3210 service handles starting, stopping and management of other system services. Scheduler 3230 provides management of tasks that were scheduled by the user and may in turn trigger actions by other tasks. Scheduler 3230 additionally provides initiation and control of various background tasks, e.g., forecast updates, post collection data manipulation, background queries, etc., which are used for the ongoing system models and actions. Notifications and tasks service 3240 handles actual processing of the various actions including notifications and tasks, e.g., sending e-mails, placing items on a user's task list, etc., which may occur in response to calls from scheduler 3230. SQL generator and query builder process 3250 takes input from other modules including the client workbench queries function 6220 (FIG. 6) and generates a flexible, configurable SQL statement that can either be applied directly to the database 4100 within PRISM module 4000, saved for scheduled execution, or retained as an aspect of background processing. Installation and license manager service 3260 handles the various installation and startup operations and facilitates ongoing checks and updates of licensed code. Database (DB) manager (Mgr) 3270 in conjunction with DB interface 3271 provide the interface layer services for supervisor to PRISM database 4100 accesses.

Figure 3:
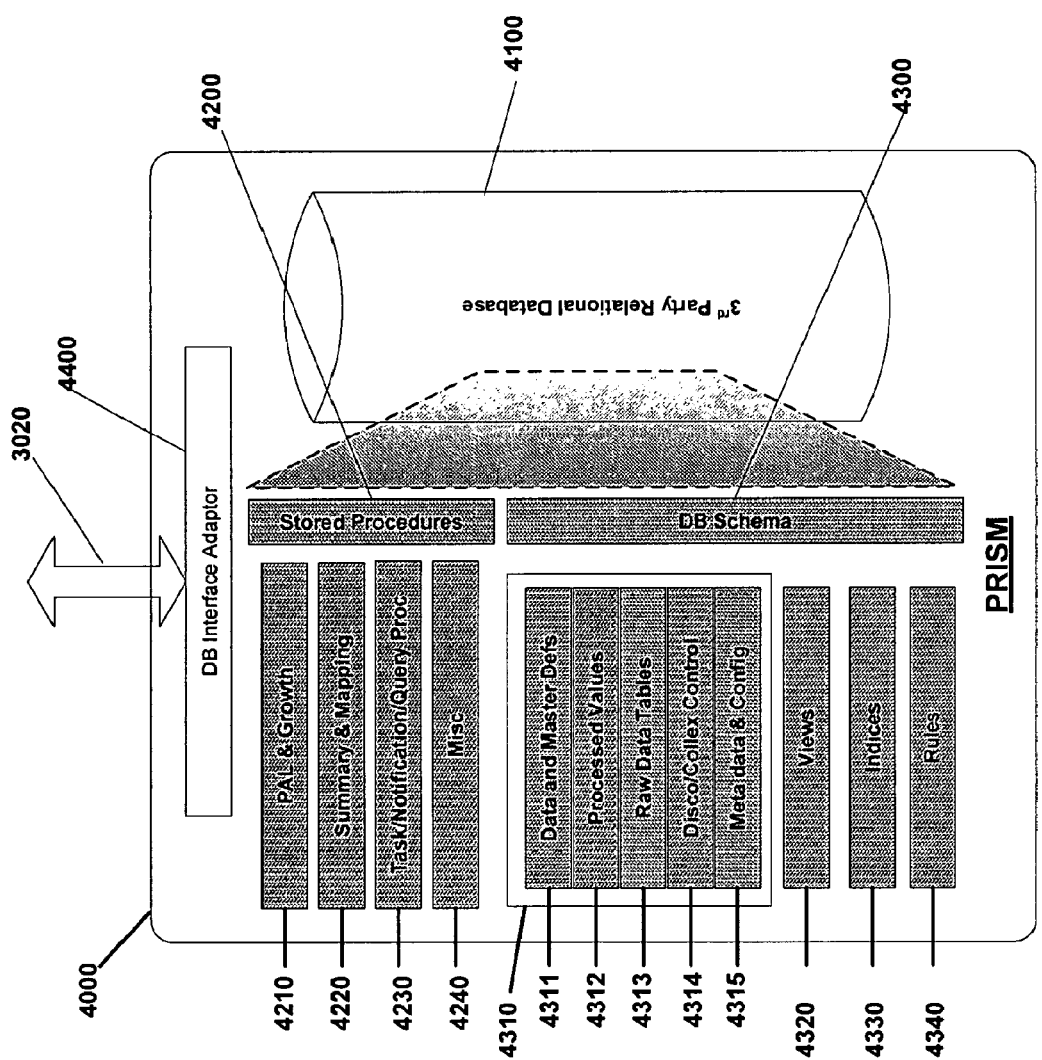
FIG. 3 shows a detailed view of a persistent repository with integrated schema mechanism module in accordance with an embodiment of the present invention.

FIG. 3 illustrates the internal make up and interfaces of PRISM 4000 module in accordance with one embodiment of the present invention. Persistent Repository with Integrated Schema Mechanism (PRISM) module 4000 includes relational database 4100 with an integrated schema 4300 and a set of stored procedures 4200, along with a DB interface adaptor 4400, which provides support for supervisor interface 3020. Schema 4300 includes a set of tables 4310, rules 4340, views 4320 and indices 4330. These define the structure of the data, how it is treated and its external views. The data is organized in one embodiment as a set of raw data tables 4313, data and master definition tables 4311, processed values tables 4312, discovery and collection control tables 4314 and meta data and configuration tables 4315. The set of stored procedures 4200 operate on these tables using the views and indices, and include basic sets of proprietary functions and algorithms. The peak, average and last (PAL) and growth procedures 4210 handle much of the raw data table 4313 processing providing the processed values 4312. The summary and mapping functions 4220 provide for data structures that are used by the views as well as the SQL generator processes 3250. The task/notification/query procedures 4230 work in conjunction with the supervisor notification and tasks procedure 3240, the SQL generation 3250 and the scheduler 3230 processes. Procedures used for house cleaning, maintenance and general management are considered as miscellaneous procedures 4240.

Figure 4:
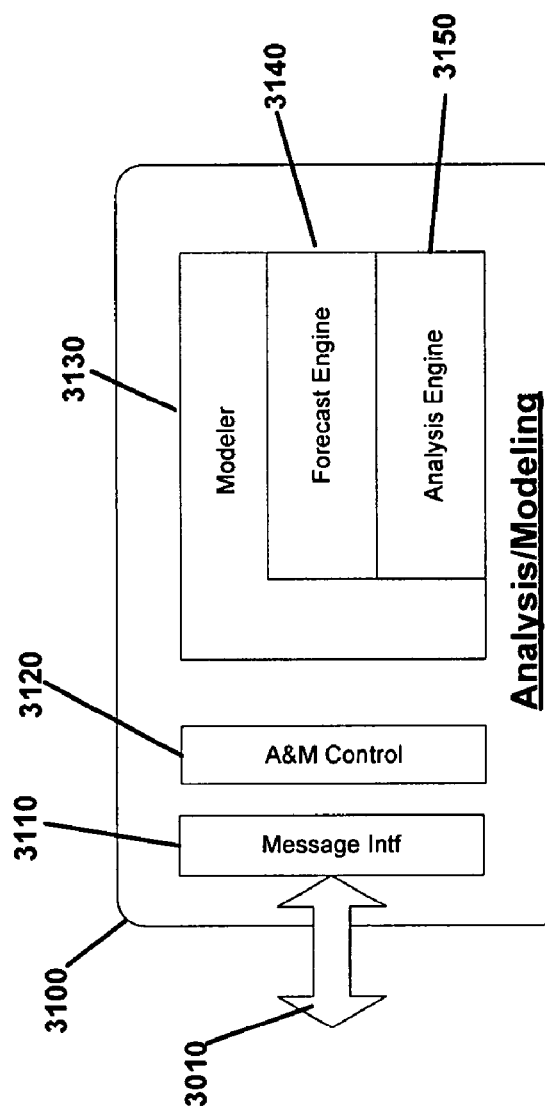
FIG. 4 shows a detailed view of an analysis and forecasting process module in accordance with an embodiment of the present invention.

FIG. 4 is a diagram illustrating analysis and modeling processes module 3100. Analysis and modeling processes 3100 include a systems message interface 3110, an analysis and modeling (A&M) control 3120 and a set of modeler 3130 process, forecast engine 3140 (or engines) and analysis engine 3150 (or engines) functions. Systems message interface 3110 can send or receive messages from the various other systems components via the supervisor message and routing control 3280. Message interface 3110 provides the request/response and message parsing logic used for handling and interpreting messages for the analysis and modeling processes 3100. A&M control 3120 process accepts messages or tasks and provides basic interpretation and control required to implement the requested actions and provide the necessary response data. Modeler 3130 process provides several proprietary functions that wrap forecast 3140 and analysis 3150 engines. Analysis 3150 and forecast 3140 engines, in turn, provide the detailed analytical functions necessary to provide the A&M 3100 function with its detailed mathematical features.

Figure 5:
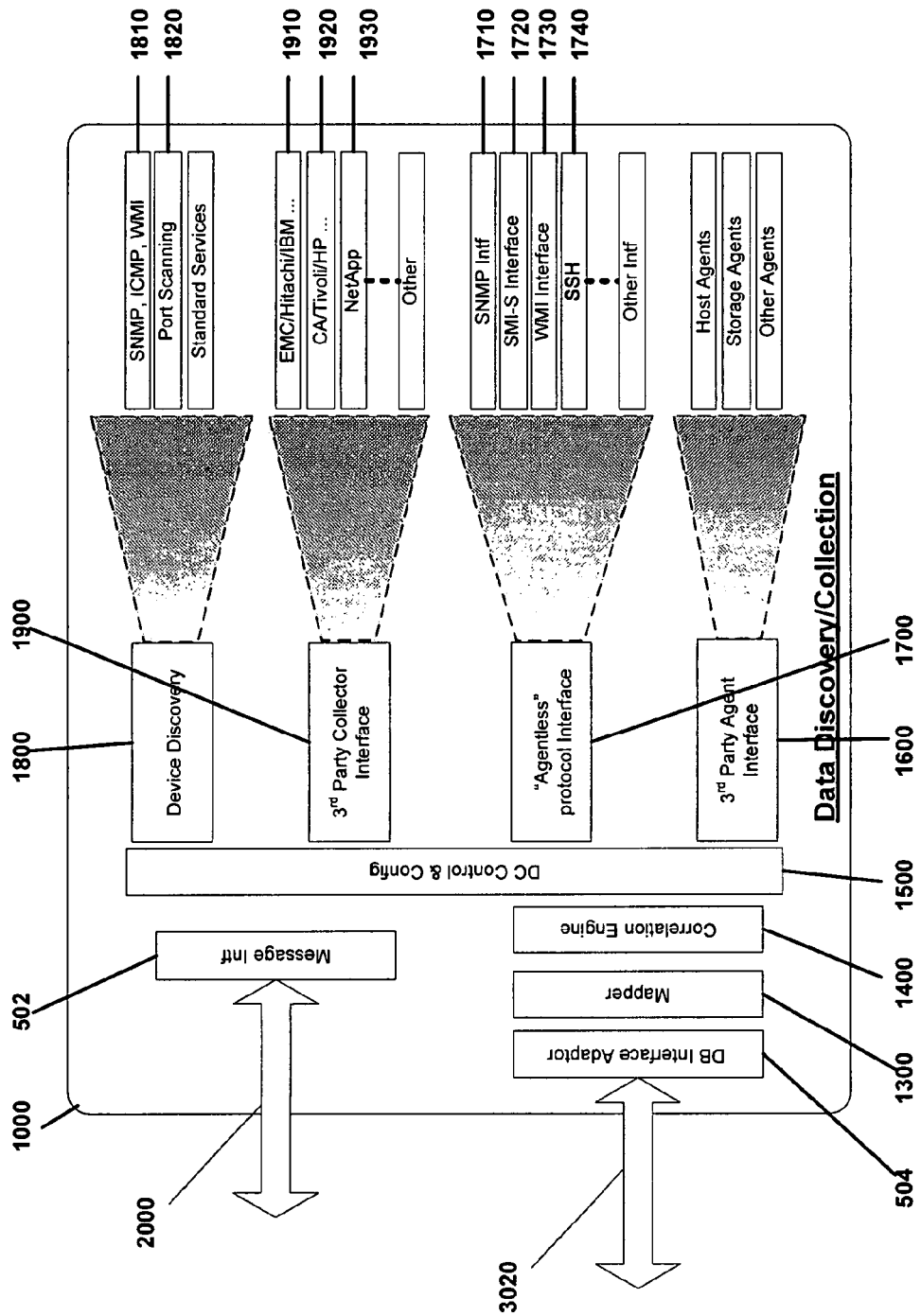
FIG. 5 shows a detailed view of a collection and discovery processes module in accordance with an embodiment of the present invention.

FIG. 5 provides an illustration of discovery/collection (DC) module 1000 in accordance with an embodiment of the present invention. DC module 1000 includes a message interface 502, a DC control and configuration function 1500, several discovery and collection modules—device discovery engine 1800, third party collector interface 1900, agentless protocol interface 1700, third party agent interface 1600; each with several supported protocols and technology interfaces—a correlation engine 1400, a mapper 1300 and a DB interface adapter 504. Message interface 502 can send and receive messages from the various other systems components via the supervisor message and routing control 3280. Message interface 502 provides the request/response and message parsing logic required for handling and interpreting messages for the data collection and discovery processes 1000. DC control and configuration process 1500 accepts messages or tasks and provides basic interpretation and control required to implement the requested actions and provide the necessary response data. DC module 1000 additionally includes several collection engines tailored to various interfaces, protocols and collection or discovery methodologies.

Device discovery engine 1800 can collect from a single unique IP address or a range (or ranges) of IP addresses using standard SNMP, ICMP, or WMI 1810 protocols. Device discovery engine 1800 can also interface directly with existing configuration and control services including, but not limited to DNS, Radius and DHCP 1830; and can also use a port scanning mechanism 1820.

The information gathered is used to determine the existence and nature of the various collectable entities available to the system. The third party collector interface 1900 utilizes third party APIs such as the well-known SymmCLI interface from EMC to collect directly from various network accessible entities and other applications, e.g., storage subsystems 1910 such as those sold by EMC, IBM, and Hitachi; enterprise and storage manage software 1920 such as from CA, Tivoli, and Openview; and filers 1930. Agentless protocol interface 1700 uses standard networking protocols such as SSH 1740, SNMP 1710, SMI-S 1720, or WMI 1730 to query and gather general and specific information from hosts, servers, filers, storage subsystems, network devices and other electronic elements. Third party agent interface 1600 can be used to collect information from other vendors' resident agents or applications, including mail servers and database systems, for example. The collected information is then processed by correlation engine 1400 prior to being mapped into the PRISM DB schema 4300 for deposit into the relational database 4100 by mapper process 1300 via its internal DB interface adaptor 504.

Figure 6:
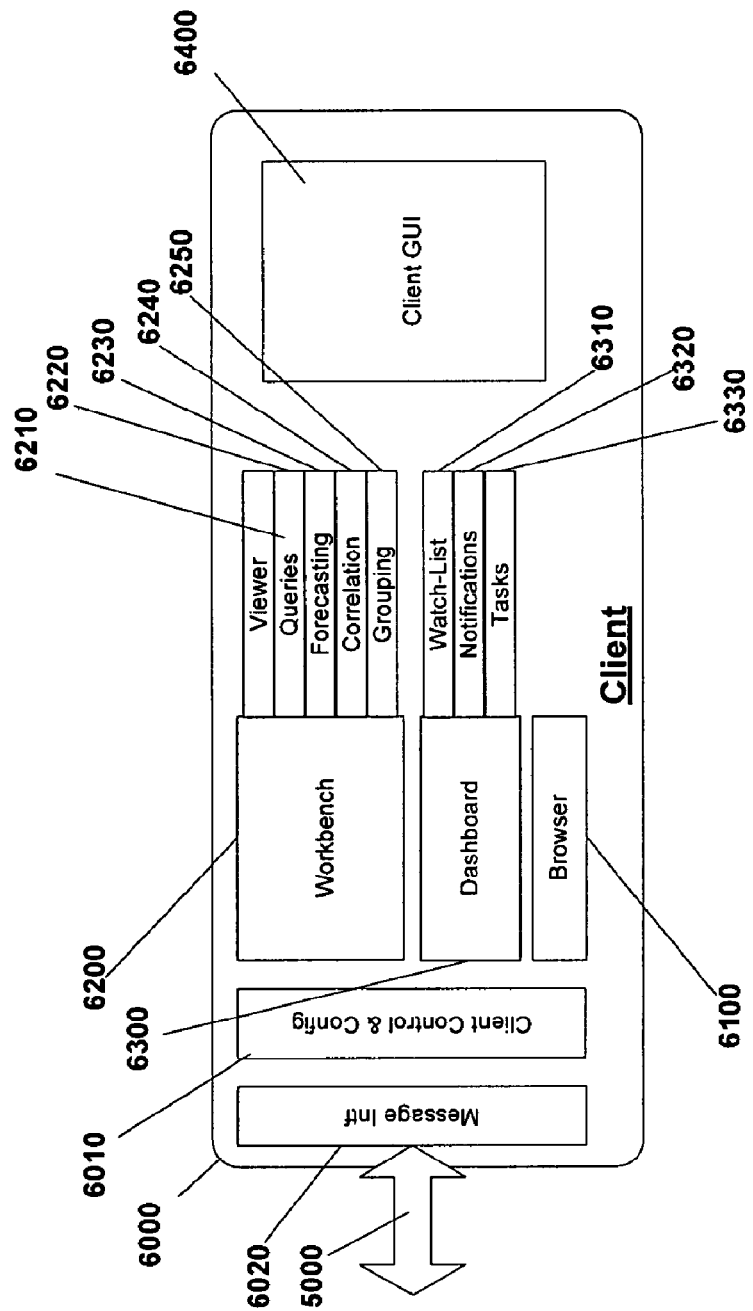
FIG. 6 shows a detailed view of a user interface process module in accordance with an embodiment of the present invention.

FIG. 6 provides a detailed view of client module 6000 in accordance with an embodiment of the present invention. Client module 6000 includes a message interface 6020, a client control and configuration process 6010, a workbench 6200 with several supported processes, a dashboard 6300 with several supported processes, a browser 6100 and a client UI 6400. Message interface 6020 can send or receive messages from the various other systems components via the supervisor message and routing control 3280. Message interface 6020 provides the request/response and message parsing logic for handling and interpreting messages for the client processes 6000. Client control and configuration process 6010 accepts messages or tasks and provides the basic interpretation and control to implement the requested actions and provide response data. Workbench 6200, dashboard 6300 and browser 6100 provide the basic functionality presented through the actual client GUI 6400. Workbench 6200 includes viewer 6210, queries 6220, forecasting 6230, correlation 6240 and grouping 6250 functions, while the dashboard includes watch list 6310, notifications 6320 and tasks 6330 functions.

Discovery, Collection and Correlation

To enable flexible, predictive and other types of analysis, data must first be obtained representing the entities being analyzed and their related parameters. One place to gather such information is from the entities themselves, in one embodiment as continuing series of data representing both the current state of the entity and its history. As noted above, system 100 includes various types and forms of computing systems 10, e.g., hosts, servers, and filers, which may have dedicated, internal storage 20; directly attached 40, external storage 21; or external storage 22 connected via a network 50, 30. The computing systems may include one or more different file systems, databases and other end user applications.

An additional place to gather information is from the related business itself, for the true driver of storage needs is the business and it, in turn, is driven by its goals. It is thus advantageous to understand the business objectives and how they relate to storage usage to provide an effective capacity planning solution.

To collect from this environment necessitates that system 100 have an understanding of what is to be collected and from where. This entails some form of discovery operation which gains an understanding of the scope and nature of the entities available from which data can be gathered as well as a link to the repository for business metrics and goals. System 100 includes this functionality, which is characterized by a high degree of flexibility, putting the discovery scope and mechanism under user control.

System 100 includes one or more discovery control files (DiscoControlFile) mechanism, generated by the user, to control discovery operations. This control file defines the scope and manner in which discovery is handled by DC module 1000. The control file in one embodiment specifies a range or ranges of IP addresses; a set of host names; locations of enterprise servers that contain enterprise systems information, e.g., domain DNS, enterprise radius server, etc.; and the location of an external file that provides the discovery parameters. In alternative embodiments, more or fewer items may be specified in the file. DC module 1000 can be run interactively, in real time, by the user or as a background task.

The discovery process in one embodiment provides a resulting set of status and results that not only provide feedback to the user but can be used to automatically generate and adjust a subsequent collection process.

In addition to understanding the nature and mechanism of what should be collected, system 100 gathers current data on a regular, prescribed basis from the specified entities and the related business. A collection process of system 100 performs this task in one embodiment using a non-invasive methodology that requires no installation or persistent residence of processes on the collected entities that are dedicated to the collection task, while offering a high degree of flexibility and which can be run interactively in real time by user, or as a background task. Data is preferably collectable from a combination of the user, the infrastructural components of the environment, and from the business itself. The collection process in one embodiment receives the output of the discovery process above, which allows a user to adjust the scope of collection by adding newly-discovered entities and removing those that no longer exist.

Finally, system 100 correlates the collected data such that inter-relationships can be melded into the system's understanding of the data, its environment and the business. The inter-relations, i.e. association of the end user, or application, to actual storage usage, and subsequent correlation to key business metrics provide for truly effective capacity management that details not merely what should be added, but why, when and of what type.

The correlation 1400 and mapping 1300 processes of system 100 in one embodiment are non-invasive, requiring no processes dedicated to system 100 to be persistently on the collected entities themselves. They provide a heuristic system for correlating the complex relationships involved in an enterprise storage environment, correlating users to applications to storage. They may run on a user specified basis as a background task, and include an ability to meld user supplied correlations with those determined automatically by system 100.

Discovery Flow

Figure 11:
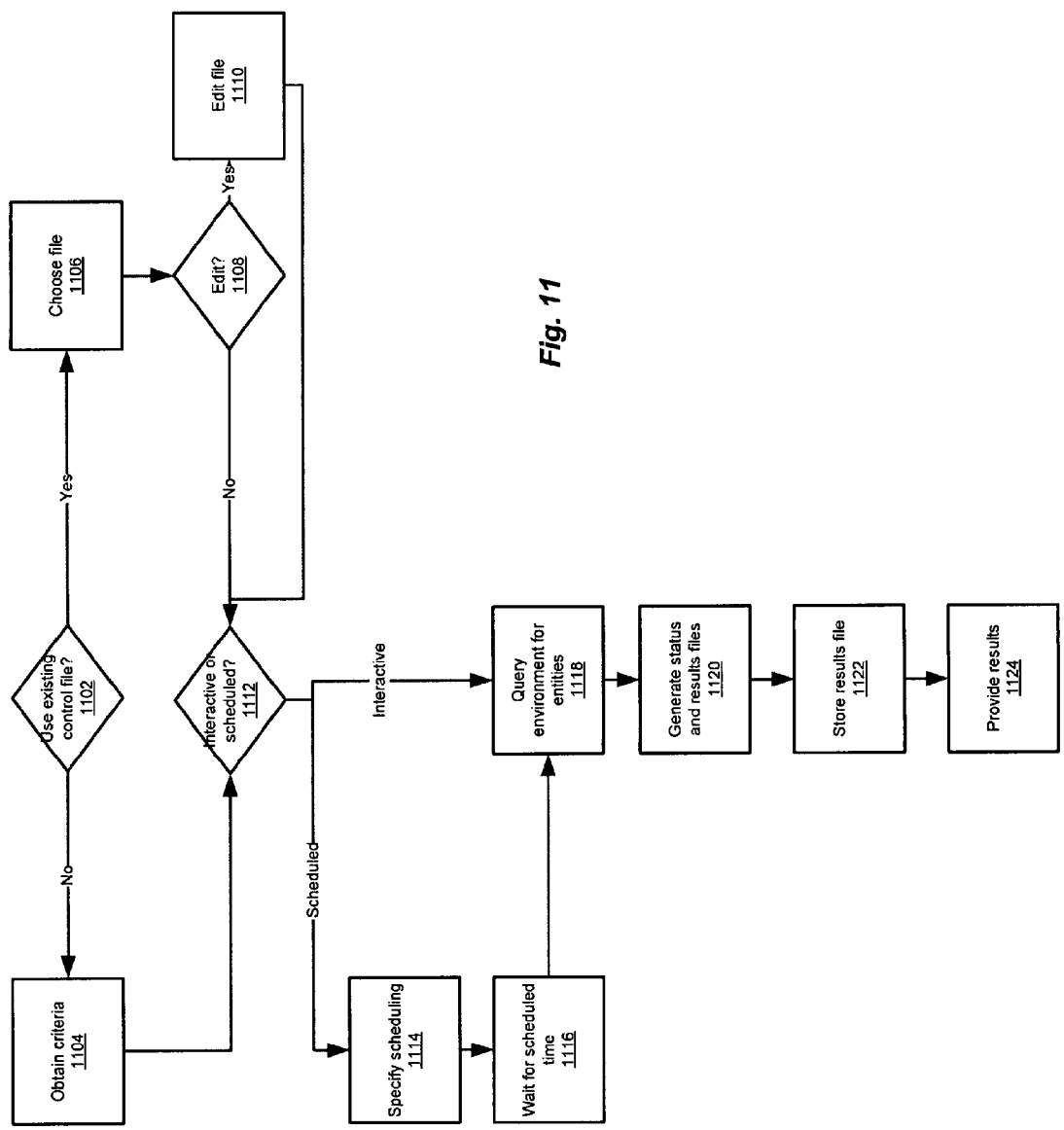
FIG. 11 provides an operational flow of a discovery process in accordance with an embodiment of the present invention.

FIG. 11 provides an operational flow of a discovery process of system 100 in accordance with an embodiment of the present invention.

System 100 initially queries 1102 the user at the beginning of the user-initiated discovery process via UI 6400 to determine whether to use an existing previously-defined control file or instead to use a new control file. If the user indicates that a new file is to be used, system 100 obtains 1104 criteria for the new file. In one embodiment, criteria includes:

An IP address, or a range of IP addresses that system 100 should discover;

A host name or a set of host names that system 100 should discover;

An IP address or host name for the encompassing environment's configuration management system(s). These are systems that are used by the environment to manage names, addresses, and account information for elements within the enterprise, e.g. DNS, DHCP, Radius etc. System 100 can use the information contained in these management servers to seed the discovery process; and A complete file path for an external file containing parameters that the system's discovery processes can use to seed the discovery process.

As will be appreciated by those of skill in the art, more or fewer criteria can be included in the new control file.

If the user indicates that he wishes to use an existing control file, he then specifies 1106 a file to be used and is given an option 1108 to edit 1110 the file in order to add or change any of the criteria specified by the file.

In an alternative embodiment, instead of using control files for the discovery process, criteria is specified as a database table, for example located in PRISM database 4000.

Next, the user specifies 1112 whether the discovery process should run interactively or via a set schedule. If the user indicates that a schedule should be used, the user then specifies 1114 what the schedule should be. In one embodiment, the parameters specified by the user include the frequency with which the schedule should run, e.g., daily, weekly or monthly; and a start time, including a time of day and, if the schedule is weekly or monthly, a day of week or of the month on which to scan. Once the schedule is specified, system 100 waits 1116 for the scheduled time to arrive.

If the user specifies that the process should run interactively, or once the scheduled time has arrived, discovery engine 1100 uses the information in the control file to query 1118 the enterprise environment to look for the existence of and type of entities indicated by the control file. Discovery engine 1100 then takes the data obtained from the query and generates 1120 a status and results file, indicating success of the individual discoveries. Discovery engine 1100 then passes the status and results files, which in one embodiment are the same file, and in an alternative embodiment are two or more files, to server 3000 via DC interface 2000. Server 3000 stores 1122 the status and result files to PRISM repository 4000 and routes the message to client 6000 via client interface 5000. Client 6000 then uses UI 6400 to provide 1124 the resulting status to the user. In an alternative embodiment, rather than using status and results files, discovery engine 1100 updates tables in PRISM database 4000, and passes a message to client 6000 with the location of the updated tables, or if the location of the tables is pre-specified, only an indication that the tables have been updated need be passed.

Once the discovery process has concluded, the user can use the discovery results to create or update a collection control file (CollexControlFile) manually or automatically.

Collection and Correlation Flow

Figure 12:
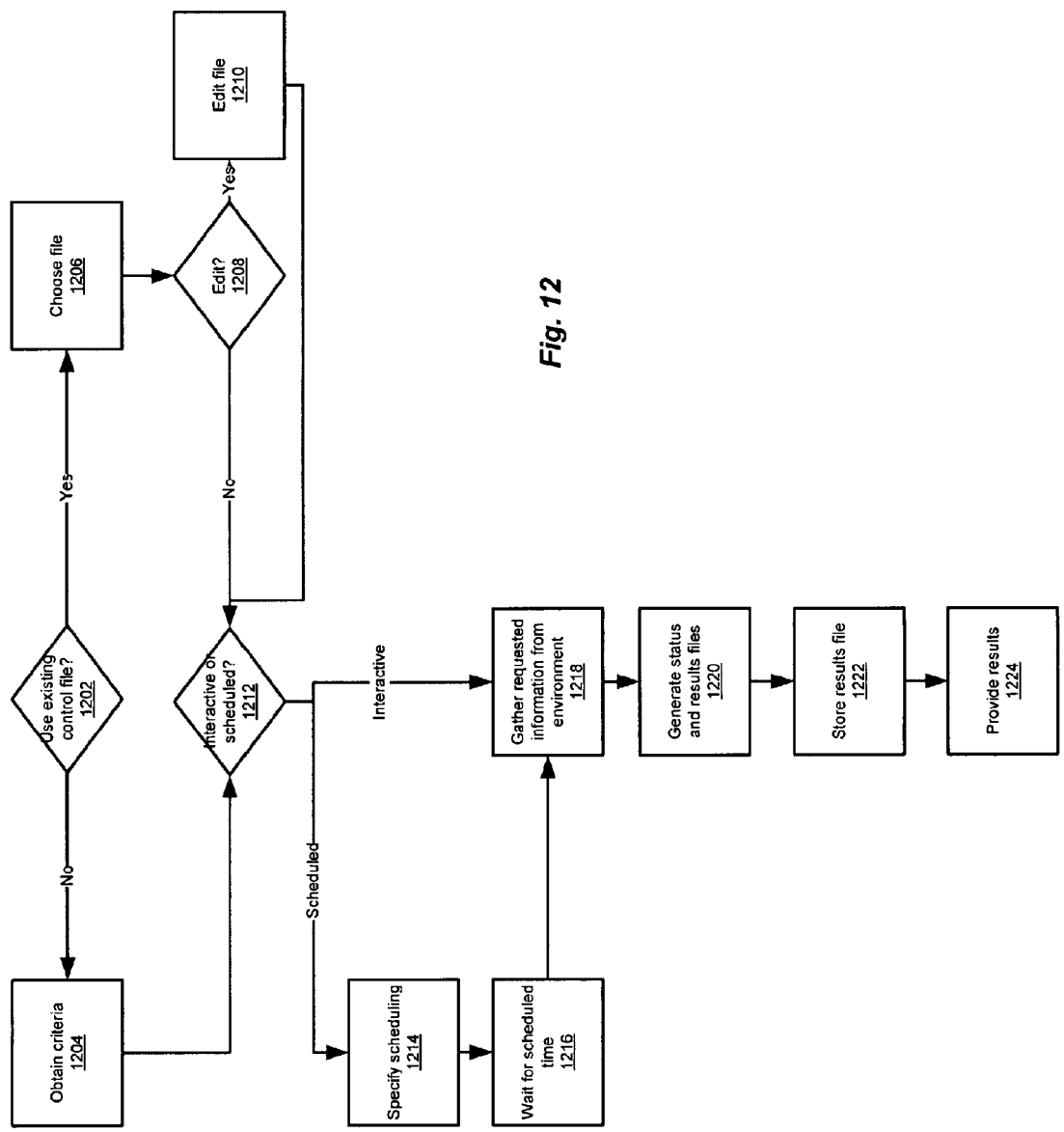
FIG. 12 provides an operational flow of a collection process in accordance with an embodiment of the present invention.

FIG. 12 provides an operational flow of a collection process of system 100 in accordance with an embodiment of the present invention.

System 100 initially queries 1202 the user at the beginning of the user-initiated collection process via UI 6400 to determine whether to use an existing previously-defined control file or instead to use a new control file. If the user indicates that a new file is to be used, system 100 obtains 1204 criteria for the new file. In one embodiment, criteria includes:

An IP address, or a range of IP addresses with access parameters;

A host name or a set of host names with access parameters;

A set of application identifiers with access parameters;

Location of enterprise servers that contain enterprise systems information, e.g., domain DNJS, enterprise radius server, etc.;

Location of an external file that provides the collection parameters; and

Specific DiscoCollexFiles references.

As will be appreciated by those of skill in the art, more or fewer criteria can be included in the new control file.

If the user indicates that he wishes to use an existing control file, he then specifies 1206 a file to be used and is given an option 1208 to edit 1210 the file in order to add or change any of the criteria specified by the file.

Next, the user specifies 1212 whether the collection process should run interactively or via a set schedule. If the user indicates that a schedule should be used, the user then specifies 1214 what the schedule should be. In one embodiment, the parameters specified by the user include the frequency with which the schedule should run, e.g., daily, weekly or monthly; and a start time, including a time of day and, if the schedule is weekly or monthly, a day of week or of the month on which to scan. Once the schedule is specified, system 100 waits 1216 for the scheduled time to arrive.

If the user specifies that the process should run interactively, or once the scheduled time has arrived, collection engine 1200 uses the information in the control file to question 1218 the enterprise environment, gathering information requested for the entities specified by the control file. Collection engine 1200 then takes the data obtained from the query and generates 1220 a status and results file, indicating a degree of success of the individual collections, success being a measure of whether a response was received from the entity. In one embodiment, the status file indicates the degree of success or failure of the individual collections, while the results file provides the actual collected data, for example size and usage information. Collection engine 1200 then passes the status file to server 3000 as a message via DC interface 2000. Server 3000 saves a copy of the status to PRISM repository 4000 and routes the message to client 6000 via client interface 5000. Collection engine 1200 next passes the results file to correlation engine 1400 and to mapper 1300, as well as to PRISM repository 4000 via DB interface adapter. Client 6000 then uses UI 6400 to provide 1224 the resulting status to the user, if requested.

In one embodiment, the collection control file is created using output of the discovery control file. The user may, manually or automatically, use the results of a previous discovery process to update or seed the collection control file. When performed automatically, this allows the user to collect from newly discovered entities and stop collecting from those that may no longer exist.

Once the collection process has concluded, the user has the ability to use the collected and correlated results as part of analysis and capacity planning operations, as described further below.

Grouping

System 100 enables a method of organizing around, or adhering to a user's associations and way of thinking about storage environments, which enables him to analyze his data in such a way that his questions align themselves with his natural view of his enterprise.

System 100 enables a flexible and adaptive association mechanism. Groups and associations are not defined by static lists of elements. Instead, the user has total control over a rules-based association mechanism that defines group membership. The association mechanism allows a user to:

Specify permanency of group membership;

Nest groups;

Create public groups that are available for other users, or private groups for sole use of the creator;

Use semantic as well as logical error checking to ensure that the user has not created a non-sensible group, e.g., one that would always return NULL; and Automatically generate supporting data tables characterizing the usage and utilization of the group.

Figure 13:
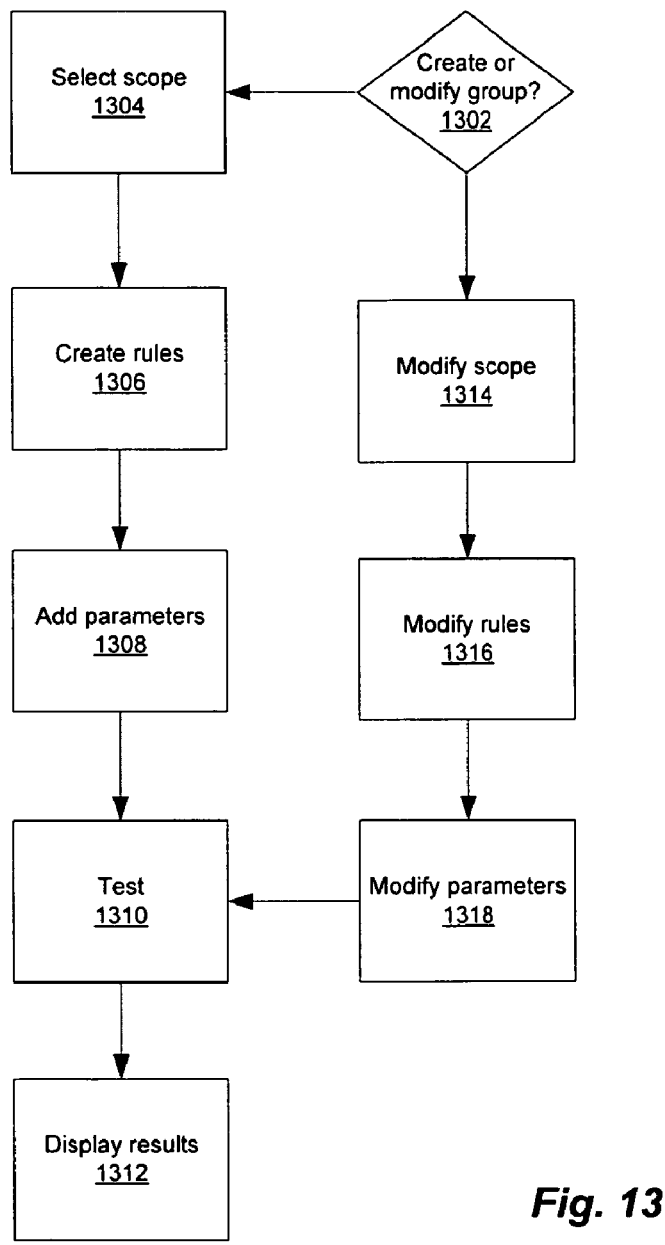
FIG. 13 illustrates a method for performing dynamic grouping in accordance with an embodiment of the present invention.

FIG. 13 illustrates a method for performing dynamic grouping in accordance with an embodiment of the present invention.

When a user initiates the dynamic grouping process through UI 6400, the user indicates 1302 whether he would like to create a new group or modify an existing one. If the user indicates that he would like to create a new group, then workbench 6200 and grouping module 6250 are invoked to carry out the creation of the new group. Grouping module 6250 allows the user to select 1304 a scope of items to use for the new group. In one embodiment, the user can specify that everything known to the system should form part of the group. Alternatively, the user can select a subset of entities to form the group. In another alternative embodiment, the user can select an existing group to be nested within the new group. After selecting the scope of the group, the user then creates 1306 a rule for selecting entities to add to the group. In one embodiment, a rule is of the form:

Return X from Y if [rule parameters]

where X is any specific entity or element type, and

Y is an existing group or entire scope of known entities

Rule parameters are specific attributes known by system 100 (either collected or determined) relevant to the group and entity or element type.

For example, a rule might be of the form "return all hosts from the Fresno data center where OSType=Windows"; or "return all volumes from the group of Windows hosts in Fresno where usage exceeds 100 gigabytes".

After the user has specified the rules for the group, he then adds 1308 parameters for the group. In one embodiment parameters include whether the group is public or private; if public, whether it is to be readable and writeable or only readable; and whether the group is active, i.e. its rule is to be evaluated after each collection.

Next, the user in one embodiment can choose to test 1310 the group rules and determine the resulting group memberships. In one embodiment, the new or modified group information provided by the user via UI 6400 is sent via client interface 5000 to server 3000, which saves the group information in PRISM repository 4000. Server 3000 uses SQL gen/query builder process 3250 (FIG. 2) to translate the rule provided by client grouping module 6250 into a SQL statement that it then passes to PRISM 4000 for evaluation.

PRISM 4000 returns any valid results to server 3000, which in turn composes a message back to client 6000 with the results, and those results are then displayed 1312 to the user. In one embodiment, if no valid entities matched the rule conditions, then NULL is returned.

Following the test, the user can save the group data, in which case server 3000 stores the data in PRISM 4000. In one embodiment, the group rules and the actual SQL statements are stored along with the group parameters. Further, in one embodiment, the actual group members are retained until the next group update or collection occurs. In addition, PRISM in one embodiment uses its stored procedures 4200 (FIG. 3) for peak, average and last (PAL) and growth 4210 to create a roll up for the group members, as specified by the saved rule, that in one embodiment includes:

Peak collected usage and utilization data for the current day, for an aggregation of the group members;
Average collected usage and utilization data for the current day, for an aggregation of the group members;
Last usage and utilization data for the current day, for an aggregation of the group members;
Standard deviation from average, for usage and utilization data, for the current day, for an aggregation of the group members;
Change, in usage and utilization, over the previous 1, 7, 30, 90 and 180 days The resulting output from the PAL and growth 4210 stored procedures are then retained in processed values table 4312 within PRISM repository 4100.

If, at step 1302, the user chooses to modify an existing group, he may first modify 1314 the scope of the group; modify 1316 the rules; and modify 1318 the parameters, as described above. Next, he may choose to test 1310 the modified group settings also in the manner described above.

For those groups that are marked as active, supervisor 3200 in conjunction with PRISM 4000 updates the group membership based on the latest collected data. In one embodiment, this begins with data discovery/collection module 1000 informing supervisor 3000 upon completion of a collection process. Supervisor 3000 then informs PRISM 4000 that a collection has been completed, and PRISM 4000 uses stored procedures 4200 to update the group membership and modify the PAL and growth table entries (if another data collection for that day is already in place), or add another row (if this is a new day). Any items that are new to the group are then flagged so that the user can easily identify the new items upon subsequent review.

Forecasting

System 100 allows a user to create, modify and save forecast scenarios via client UI 6400. A scenario may include one or more models; statistical relevance data; a resulting forecast; key business metrics and trends; and correlation data.

When a user uses client browser 6100 to initiate a forecast scenario, the user first indicates whether to use a new or existing scenario. A scenario in one embodiment includes a historical data series; a modeled data series generated from historical data series analysis or through one or more correlations; a forecast data series; and various model, correlation and forecast parameters such as a desired confidence level, forecast horizon, etc.

If the user indicates that he wishes to use an existing scenario, then system 100 presents the user with a list of existing scenarios from which to choose. Alternatively, if the user chooses to create a new scenario, then workbench 6200 and forecasting module 6230 (FIG. 6) are invoked to carry out the creation of the new scenario.

Next in creating a new scenario, the user selects the scope of historical data from a list provided by client browser 6100. The scope defines a set of elements, entities or groups against which the model and resulting forecast are created.

Forecasting module 6230 next obtains modeling parameters from the user. In one embodiment, one modeling parameter specifies which aspect of a selected data series is to be used. Each element or entity has a plurality of data aggregations from which to choose, including:

Peak collected usage and utilization data for the current day, for an aggregation of the group members;
Average collected usage and utilization data for the current day, for an aggregation of the group members;
Last usage and utilization data for the current day, for an aggregation of the group members; and
Standard deviation from average, for usage and utilization data, for the current day, for an aggregation of the group members.

Another modeling parameter specifies which view to apply to the group, entity or element chosen earlier. In one embodiment, choices include generating a model for each individual member of the group; or generating a model based on a rollup of the group data, with the rollup done before or after model generation.

Another modeling parameter specifies a historical time period with which to work, including a starting date and an ending date.

An additional modeling parameter specifies which data series types to analyze. The specified group, entity or element may have data represented by different data series types, which in one embodiment include:

Usage, e.g., gigabytes;
Utilization, e.g., as a percentage of available storage;
Costs;
Physical attributes, e.g., power consumption, floor space used, etc.;
Performance; and
Failure rates.

As those of skill in the art will appreciate, additional data series types may be of interest to various different users, and therefore the above list is not intended to be exhaustive.

Another modeling parameter specifies confidence levels and risk factors for the model. Still another specifies model methodologies, including in one embodiment, a single algorithm; a tournament; or multiple selected algorithms.

In addition to specifying modeling parameters, the user also can specify basic parameters, which in one embodiment include whether the scenario is public or private and, if public, whether it is writeable as well as readable; whether the scenario is active, i.e. whether it should be evaluated after each collection occurs; and whether any special query association tags apply.

With the modeling and basic parameters specified, a model can now be generated according to those parameters. UI 6400 in one embodiment passes a message including the scenario and parameters via client communication process 6010, 6020 to supervisor 3200 via client interface 5000. Supervisor 3200 uses communication processes 3280, 3281 (FIG. 2) to route the message to analysis/modeling function 3100.

Analysis/modeling function 3100 receives the message via communication processes 3110, 3120 (FIG. 4), and passes the supplied data series and parameters to modeling process 3130. Modeling process 3130 and analysis engine 3150 analyze the supplied data series to identify trends, seasonality, special events, and other factors, which are then used by modeler 3130 along with the scenario model parameters to generate a model of the supplied data series. In one embodiment, the model of the supplied data series is generated using techniques such as those found in Forecast Pro, available from Business Forecast Systems Inc., of Belmont, Mass. In one embodiment, in addition to the generated data series, the modeler provides data indicating the statistical relevance and other model validity data, such as correlation coefficients.

Modeler 3130 then passes the resulting model data and relevance and validity data back to supervisor 3200 via analysis/modeling communication layers 3110, 3120. Supervisor 3200 uses communications processes 3280, 3281 to determine that the message is intended for client 6000 and routes the message to client workbench forecasting module 6230 (FIG. 6). Client workbench forecasting module 6230 uses the client UI 6400 to display the original data series 9200 (FIG. 9), the new modeled data series 9100 ("fitted data"), and a visualization of the relevance and validity data. The resulting model can in one embodiment be saved for future viewing on client dashboard watch-list 6310 (FIG. 6).

If the user instructs system 100 to save the scenario, supervisor 3200 saves the scenario information in PRISM repository 4100. The information stored in one embodiment varies depending on where in the forecasting process the user is, and may include the selected data series; scenario attributes and parameters; model data and related relevance and validity data; correlation data; and forecast data.

The user can also view and edit the current data model, including changing any of the parameters described above in order to generate a new model. The statistical model relevance and validity guidelines previously determined can help the user select the best possible model for the historical data sets supplied.

In one embodiment, instead of using a basic model based on a historical data series to generate a forecast, system 100 can determine whether correlations exist between independent data series, either singly or in combination. These correlations can be used in conjunction with or instead of the basic model as a seed for a forecast. Correlation engine 1400 in one embodiment identifies correlations in independent data series.

System 100 in one embodiment determines correlations among any historical data series or sets of data series, and will provide the user with feedback regarding the degree of correlation and its statistical relevance. In another embodiment, system 100 determines correlations between historical data series and key business metrics (KBMs) or sets of key business metrics, and reports the degree of correlation and its statistical relevance.

Client workbench correlation module 6240 enables the creation by a user of a correlation analysis data set (CADS), which is used to check for the existence of correlations between one or more key business metrics and a historical data series. The CADS is used to specify whether the correlation analysis is specific to a particular historical data series, selected in a manner similar to the selection of a scenario described above, e.g., by specifying data types, view, historical time period, etc., or whether the correlation analysis is to be performed in relation to a set of historical data series grouped together by the dynamic grouping methodology described above. In an alternative embodiment, the correlation analysis is performed in relation to any or all groups, entities or elements tagged for general correlation analysis.

The correlation analysis data set also specifies which KBMs should be used for correlation; KBMs may be obtained from an imported file; they may be entered manually; or extracted from another application or service. In one embodiment, KBMs are expressed in the form of time-series data.

The CADS additionally specifies how the search for correlations is to be performed, for example by mapping each KBM against the data series individually; or mapping various user-selected combinations of KBMs against the data series.

The CADS also indicates whether the CADS itself is public or private and, if public, whether it is readable and writeable or only readable; as well as whether the CADS is active, i.e. whether the correlation analysis should be re-run after each collection. Special correlation association tags are also included in the CADS in one embodiment. Finally, the CADS file specifies correlation analysis methodologies to be used, e.g., single algorithm or tournament.

Once the CADS has been completed, system 100 can perform the correlation analysis. Client communication process 6010, 6020 passes a message including the CADS to supervisor 3200 via client interface 5000. Supervisor 3200 in turn passes the message to analysis/modeling function 3100, which receives the message and passes the CADS data and parameters to modeler 3130 (FIG. 4). Modeling process 3130 then generates a model based on the single KBM or based on a user-provided aggregation method for a set of KBMs. Analysis engine 3150 searches for correlations between the supplied historical data series and KBM-based model, and returns the results, referred to in one embodiment as a degree of correlation report, to the modeler 3130. The results can then be displayed to the user, indicating whether any correlation exists and including details of its statistical significance.

Figure 9:
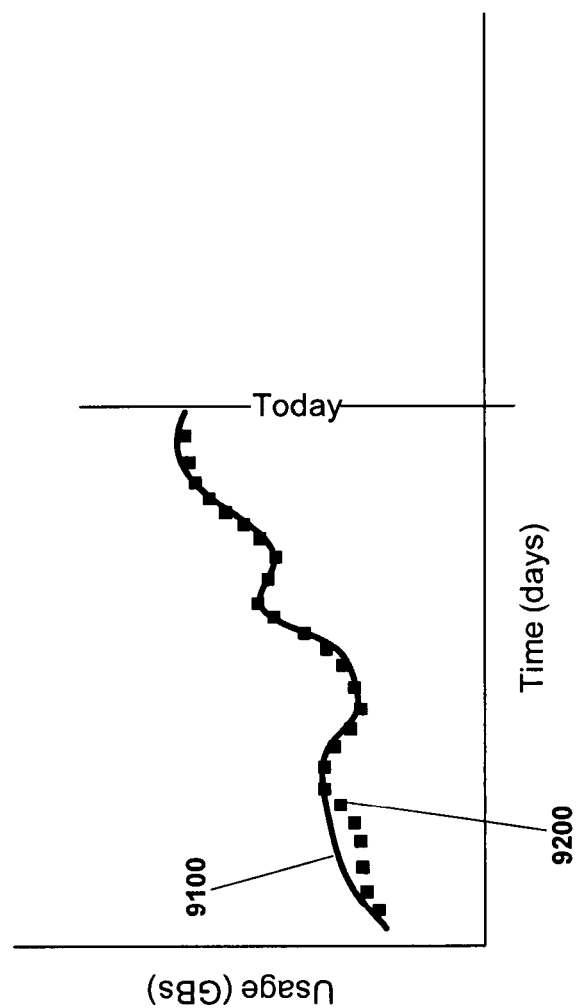
FIG. 9 shows a view of a data model mapped against an original data series in accordance with an embodiment of the present invention.

Modeler 3130 in one embodiment updates the CADS to include the degree of correlation data, and passes the updated CADS back to supervisor 3200 via analysis modeling communication layers 3110, 3120. Supervisor 3200 in turn routes the message to client workbench forecasting module 6230 (FIG. 6). Referring to FIG. 9, client workbench forecasting module 6230 in one embodiment displays the original historical data series 9200 along with the KMB-based model data series 9100. In one embodiment (not shown) a visualization of the degree of correlation data is also displayed. The view may be saved for future viewing on client dashboard watch-list 6310 (FIG. 6).

Once the user has created a model that he finds acceptable according to the process described above, a forecast can be generated. If no statistically relevant data is available, or if the user wants to implement his own custom forecast or recognizes significant changes in business or technology that may impact any forecast, then the user may choose to generate a custom forecast using, for example, Bold Freehand Extrapolation_(BFE). Alternatively, if historical analysis has a large degree of statistical relevance to the user and he believes that usage and utilization are historically consistent, a time series analysis may be used. Or, if the user has observed a close correlation with key business metrics and wishes to use projected business trends to derive a forecast, business trend based forecasting may be appropriate. We discuss each.

BFE (Bold Freehand Extrapolation) Forecasting

Figure 7:
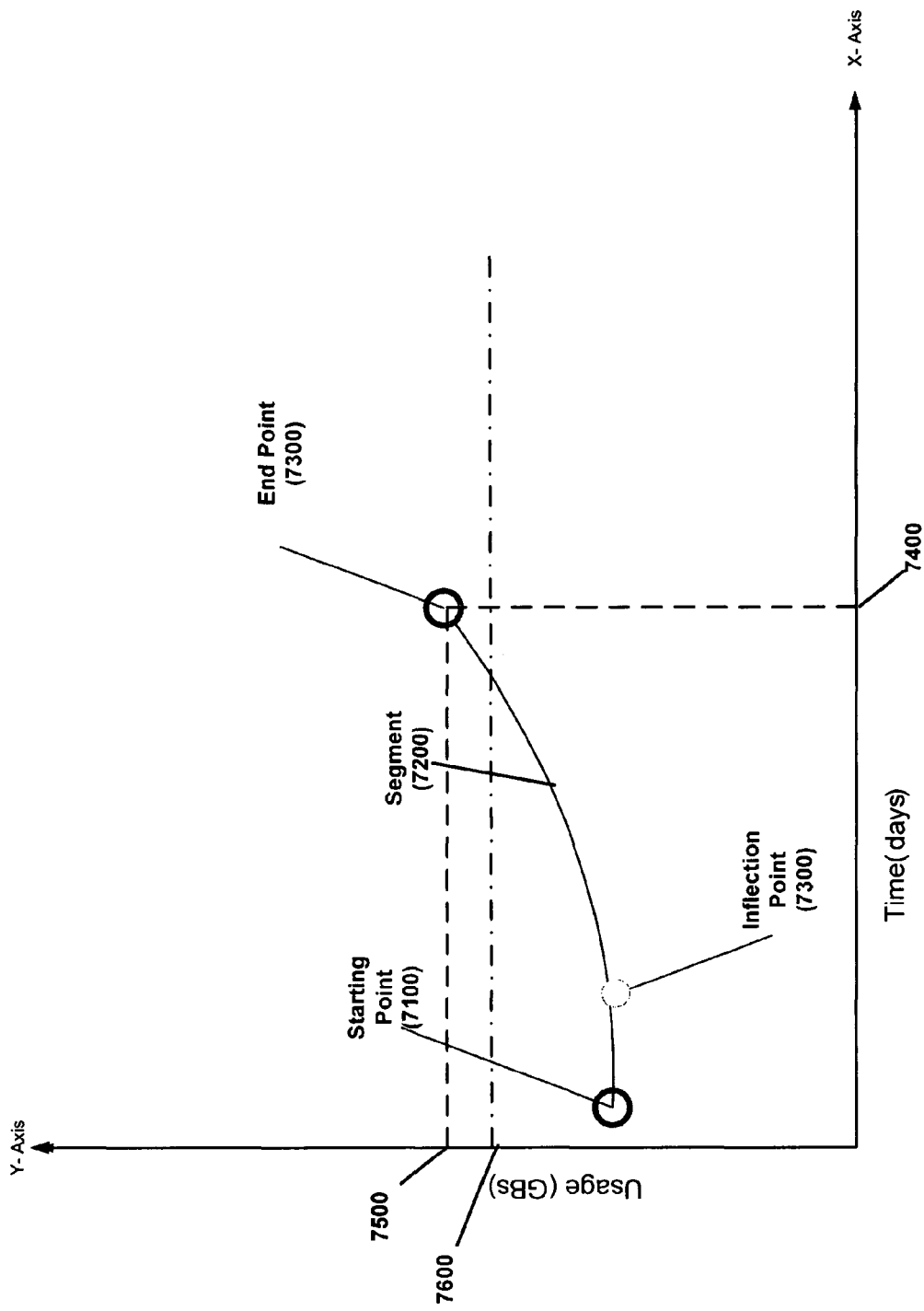
FIG. 7 shows a single segment BFE graph with its constituent parts in accordance with an embodiment of the present invention.

In one embodiment, a BFE forecast is generated using client workbench forecasting module 6230 (FIG. 6). Referring now to FIG. 7, there is shown an illustration of a BFE forecasting analysis in accordance with an embodiment of the present invention.

Because BFE forecast generation is not based strictly only historical data, the user may begin with no data, some data, or a single point of data. The user initially chooses a known starting point 7100. For a group with only a historical collected single data point, that data point is the starting point. For a group with multiple historical collected data points, the last data point, that is, the most recently collected data point, is the default starting point in one embodiment. The user can, however, pick any historical points as a starting point.

Next, the user can enter graph segments 7200. The user in one embodiment can choose the length of the segment, for example the end date 7400 on the x-axis; and whether the segment is linear or exponential. Following this, the user picks a fixed end value, which is a point on the y-axis 7500. If the user previously selected a linear segment, then the two points are connected by a line. If the user selected an exponential segment, then the user can adjust inflection point 7300, for example by dragging it left or right. The resulting graph is a forecast chart as illustrated in FIG. 7.

Figure 8:
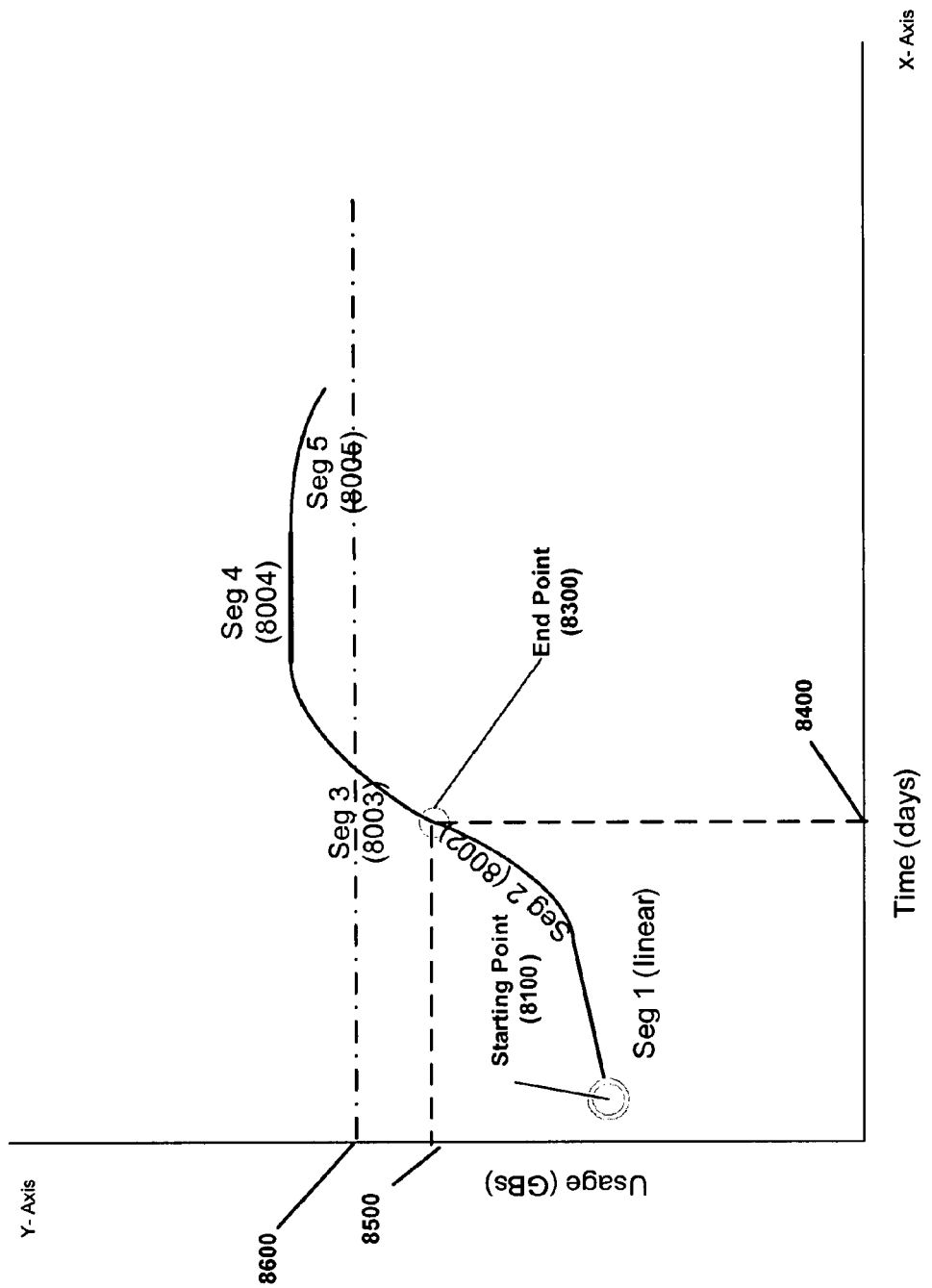
FIG. 8 shows a view of an extended, multi segment BFE graph with its constituent parts in accordance with an embodiment of the present invention.

Referring to FIG. 8, as will be appreciated by those of skill in the art, the user can extend the BFE forecast by adding additional segments 8002, 8003, 8004, 8005 or modifying a segment endpoint 8300. The end point can be moved left or right, up or down. Moving the end point changes the start point for the next segment. If the subsequent segment has a fixed end value, that point remains fixed and system 100 reconnects a new start point with the old end point, retaining the linear or exponential aspect of the segment. Alternatively, if the subsequent segment has an end value determined by system 100, then system 100 re-evaluates the new ending value, keeping the linear/exponential and rate of change values fixed, but adjusting the end point. The next segment may be affected by this process as well. This process continues until system 100 reaches a segment with a fixed end value. The user can also extend the BFE forecast by setting the y-axis threshold 8600.

In addition, the user can activate or inactivate the forecast, and can save the forecast as public (with or without write access) or private.

TSA (Time Series Analysis)

After the user has historical data plotted and a statistically relevant model of that data as exemplified by the graph in FIG. 7, he can begin to generate a forecast using system 100. In using a time series analysis (TSA), the user has elected to project the future based purely on the past. In one embodiment, a TSA forecast is generated using client workbench forecasting module 6230.

Figure 10:
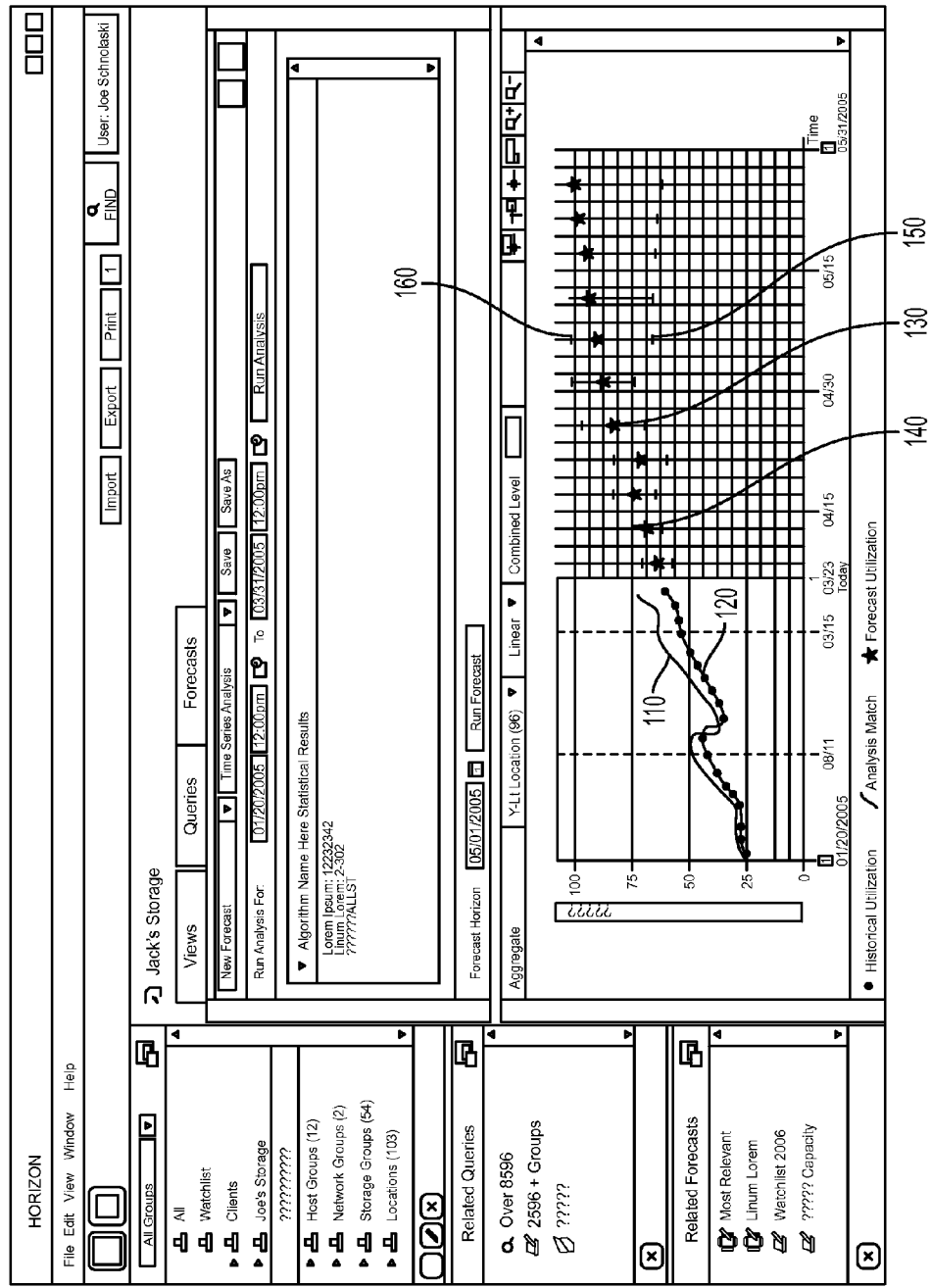
FIG. 10 shows a sample view of a forecast with its constituent parts in accordance with an embodiment of the present invention.

The user initially can select a forecast horizon and a confidence level for the resulting forecast. The scenario and forecast parameters are passed via the supervisor 3200 to analysis/modeling function 3100 and then to modeling process 3130 (FIG. 4). Modeling process 3130 in conjunction with forecast engine 3140 uses the model associated with the scenario to generate a simple TSA forecast. The modeling process 3130 then passes the resulting forecast data back through analysis/modeling communication layers 3110, 3120 and supervisor 3200 to client workbench forecasting module 6230. Referring now to FIG. 10, client workbench forecasting module 6230, using client UI 6400, displays the original data series 120, the modeled data series 130, and the forecast 140. In one embodiment, the confidence level is indicated by a shaded region with upper and lower curves 150, 160. As with the BFE forecast, the resulting display data can be saved for future viewing on the client dashboard watch-list 6310.

In addition, the user can further refine the visualization and annotate the graph, setting the y-axis thresholds and x-axis points, and including any associated notations. The user can then set the forecast as active or inactive, and can set the scenario to be public or private.

BTF (Business Trend Based Forecasting)

The results generated by system 100 provide the user with a model based on key business metrics with a known degree of correlation, mapping a key business metric or set of metrics to historical data. Using a set of business projections as metrics, e.g., a projection of how the historical business metric data may act in support of business goals, the user can then align future storage needs with the strategic goals of the business.

A business trend forecast is generated by system 100 in one embodiment using client workbench forecasting module 6230. Using forecasting module 6230, the user selects a forecast horizon; a confidence level for the resulting forecast; and imports or generates a business trend metrics data series.

A business trend metrics data series is entered manually by the user in one embodiment via UI 6400. Alternatively, system 100 can extract the data series from other business management tools such as SAP or ERP, or can import a file containing the data series from a specified location. In one embodiment, the data series is comma-separated values (csv)-formatted time series data. The set of business trends creates a scenario—a representation of a possible future—that can be used to generate a forecast. These business trends can be thought of as future data points to key business metrics.

After specifying the business trend metrics data series, a forecast is generated. The supplied scenario parameters and CADS are passed via supervisor 3200 to analysis/modeling function 3100, and on to modeling process 3130. Modeling process 3130 together with forecast engine 3140 in one embodiment uses a multivariate model to generate a forecast based on the scenario and business trends data. The modeler 3130 then passes the resulting forecast data back through supervisor 3200 and analysis/modeling communication layers 3110, 3120 and to client workbench forecasting module 6230, which, referring to FIG. 10, displays the original data series 120, the modeled data series 130 and the forecast 140 to the user. In addition, the confidence level may be indicated by shading, or upper and lower curves 150, 160. The results can also be saved for future viewing on client dashboard watch-list 6310.

In addition, the user can further refine the visualization and annotate the graph, setting the y-axis thresholds and x-axis points, and including any associated notations. The user can then set the forecast as active or inactive, and can set the scenario to be public or private.

Automatic Updating

As noted above, a scenario can be marked as active or inactive. An active scenario indicates that models and forecasts associated with that scenario are to be updated after each data collection cycle. Since queries, described below, are in one embodiment based on a forecast data series, automatic updating of scenarios ensures that a user's storage capacity plans are automatically updated to match changing technology usage and business data.

Supervisor 3320 posts collection updates as they occur for any active associations or groups. Active forecast scenarios are then updated by supervisor 3200 based on newly collected data as well as any changes to established dynamic associations. Any active queries are then reevaluated, and any specified associated actions are then taken.

Additionally, a set of scenario parameters can be tagged as applicable to each group formed with a corresponding tag. In this manner, a scenario can be applied in batch to a set of groups rather than having to be applied individually to each group. In one embodiment, supervisor 3230 retrieves any active scenarios and associations that have been tagged as applicable to groups with a corresponding tag, applies the scenario parameters to each of those groups and re-saves the new scenario models.

Querying

To facilitate capacity planning, system 100 enables analysis of existing historical and predicted future data. By querying the data, a user can discover existing conditions and predicted future events, support or disprove current theories, learn of trends or discover heretofore unknown aspects of their environment. The query mechanism is both interactive—enabling the user to learn in real time—and persistent, so that queries are updated without requiring additional user interaction as the underlying data changes. Users assign actions to be taken in the event of a non-null query, including providing notification to a user or group of users, generating and reporting a list of tasks recommended to be performed, and execution of a secondary program or process.

A user can create, modify and save a query. Using client browser 6100, the user first defines a scope for the query. The scope specifies the set of elements, entities, groups, or forecasts against which the query is to be run. If the user indicates that he wishes to create a new query, workbench 6200 and query module 6220 (FIG. 6) are invoked to create the query.

Using queries module 6220, the user creates a rule of the form:
Return X from Y if [parameters]
where X is any specific entity or element type object;
Y is an existing group, or is an entire scope of known entities;
Parameters are those known attributes, either collected or determined, relevant to the group and entity or element type.

A rule may include only a single object/attribute pair, or it may be complex, for example with queries including multiple object/attribute pairs joined with Boolean operators; or the inclusion of a time element, for example first occurrence, last occurrence, all occurrences.

In one embodiment, the user also can specify basic parameters, including whether the query is public or private and, if public, whether it is writeable as well as readable; whether the query is active, i.e. whether it should be evaluated after each collection occurs; and whether any special forecast association tags apply.

Next, the user indicates which associated actions or tasks are to be taken based on the results of the query, who, if anyone, should receive a notification or alert when the action is to take place, and by what means should the notification be delivered; and how immediately the action should be taken based on the query result. The user then saves the query and can execute it.

The user may execute the query immediately, for example as a test. When executed, client queries process 6220 first performs a logical error check of the formal query, in one embodiment. Any errors are then provided to the user to be corrected. Semantic rule checking is provided by in one embodiment providing the user with a valid set of parameters based upon the object or attributes being used. The client then sends a message to supervisor 3200 with the query rule and its associated parameters and attributes. Supervisor 3200 uses its SQL gen/query builder process 3250 (FIG. 2) to translate the rule created by client queries module 6220 into a SQL statement, which is then passed to PRISM 4000 for evaluation. PRISM 4000 evaluates the query for any non-null results and any requested output parameters and provides the results to supervisor 3200 which, in turn, composes a message back to client 6000 with the results. In one embodiment, if no valid entities match the conditions established by the query, a null response is returned to client 6000.

If any tasks or actions are associated with the query, and the query is marked as active, then supervisor notifications and tasks module 3240 (FIG. 2) takes the specified actions and performs the requested tasks. If requested by the user, the user is notified via UI 6400 of the actions being taken and the tasks being performed.

Supervisor 3200 then sends results to the client 6000 via client interface 5000. Client 6000 then uses UI 6400 to display query results to the user. The results in one embodiment are displayed in a chart format or graphical style. The display of the results may additionally include historical data for the set of items being analyzed, in one embodiment. If so, supervisor 3200 retrieves the historical data from PRISM 4000. The resulting analysis data can be saved for future viewing on client dashboard watch-list 6310.

If the user indicates he would like to save the query, the query rule and its associated parameters and attributes are sent in a message to supervisor 3200, which saves the query information to the PRISM 4000 repository. In one embodiment, both the query textual rule and the derived SQL statement are both stored. In addition, all query parameters are stored, including whether the query is public or private and, if public, whether it is readable and writeable or only readable; whether the query is active or inactive, and any association tags that may be part of the query.

In addition to creating a new query, a user can also modify an existing query, which can then be re-saved, or saved as a new query.

In one embodiment, for each active query, supervisor 3000 and PRISM 4000 reevaluate the query rule and take specified actions based on the latest collected data. Data discovery/collection module 1000 first informs supervisor 3200 that a collection process has completed. Supervisor 3200 then informs PRISM 4000 of the completion. PRISM 4000 uses its task/notification/query stored procedures 4230 (FIG. 3) to reevaluate any active queries, updating views 4320 and processed values tables 4312. Supervisor notifications and tasks process 3240 (FIG. 2) then performs any specified tasks and supplies any specified notifications.

Note that while the above description uses terms such as "electronic storage" and "storage capacity management," it is not intend to limit the described invention to such an environment. Further the term "enterprise data center" is used above to refer to a corporate computation environment that has been imbued with the processes and methods described; any computing environment may be an appropriate setting in which to use the described systems and methods.

Further, although the present invention has been described in terms of capacity management for electronic storage, it can also be applied to solving capacity planning in supply chain analysis, bandwidth analysis, and other instances in which supply is constrained and a need for forecasting additional supply requirements exists.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements or entirely in software elements. Also, the particular division of functionality between the various system components described herein is merely exemplary, and not mandatory; functions performed by a single system component may instead be performed by multiple components, and functions performed by multiple components may instead performed by a single component. For example, the particular functions of the map data provider, map image provider and so forth may be provided in many or one module. For example, in alternative embodiments, portions of system 100 reside on an entity being collected from; PRISM module 4000 executes on a processing unit separate from supervisor 3200; and the like.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for forecasting electronic data storage requirements, the method comprising:
   determining whether to use existing control data or new control data;
   if it is determined to use new control data, obtaining criteria for the new control data, at least in part by receiving a user selection of at least one of a range of internet protocol addresses and a set of host names;
   if it is determined to use existing control data, providing a user options to select the existing control data to be used and to edit the existing control data in order to add or change criteria specified by the existing control data;
   identifying from among a first plurality of computing device entities located on a network a second plurality of computing device entities that satisfies the user selection;
   collecting with an agentless protocol interface storage-related information from each of the second plurality of computing device entities, wherein said collecting comprises querying each of the second plurality of computing device entities using a network protocol, and wherein the storage-related information comprises disk usage, disk utilization, performance and failure rate;
   upon user initiation of a forecasting operation:
   when determining to use a new forecast scenario, invoking a process for creating a new forecast scenario, wherein the process comprises (1) receiving a user selection of a scope of historical data, the scope defining a set of elements, entities, or groups against which a model and resulting forecast are created, (2) obtaining modeling parameters from a user, and (3) generating a new scenario, wherein obtaining the modeling parameters comprises:
      receiving a user selection of a data aggregation, wherein receiving the user selection includes presenting to the user a choice of at least the following data aggregations: (1) peak collected usage and utilization data for the current day, (2) average collected usage and utilization data for the current day, (3) last usage and utilization data for the current day, and (4) standard deviation from average, for usage and utilization data, for the current day;
      receiving a user selection of a view to apply to the chosen groups, entities, or elements, wherein receiving the user selection includes presenting to the user a choice of at least generating a model for each individual member of the group or generating a model based on a rollup of the group data;
      receiving a user selection of a historical time period including a starting date and an ending date;

receiving a user selection of a data series type to analyze, wherein receiving the user selection includes presenting to the user a choice of at least the following data series types: (1) usage, (2) utilization as a percentage of available storage, (3) costs, (4) power consumption, (5) performance, and (6) failure rates;

receiving a user selection of a confidence level and risk factors; and receiving a user selection of a model methodology, wherein receiving the user selection includes presenting to the user a choice of at least one methodology using a single algorithm, at least one methodology using a tournament, and at least one methodology using multiple algorithms;

when determining to use an existing forecast scenario, outputting to a display a list of available predetermined scenarios for modeling the collected storage-related information and receiving a user-selected scenario from the list of available predetermined scenarios;

forecasting, based on the new scenario or the user-selected scenario, and the collected storage-related information, storage requirements of the second plurality of computing device entities for a future time period; and outputting the forecasted storage requirements to a graphical user interface.

2. The method of claim 1, wherein the network protocol comprises at least one of: a secure shell (SSH) protocol, a simple network management protocol (SNMP) and windows management instrumentation (WMI).

3. The method of claim 1, further comprising receiving a user selection of a modeling parameter, and wherein said forecasting is further based at least in part on the user-selected modeling parameter.

4. The method of claim 1, wherein said collecting is performed without installation or persistent residence of a process dedicated to a collection task on any of the second plurality of computing device entities.

5. The method of claim 1, wherein the user-selected scenario comprises at least one of: a model, statistical relevance data, business trends and correlation data.

6. The method of claim 1, further comprising following said collecting, receiving a user-defined historical collection of the storage-related information for use in said forecasting.

7. The method of claim 1, wherein collecting the storage-related information from each of the plurality of identified second plurality of computing device entities further comprises:

receiving criteria for the storage-related information to be collected;

collecting the storage-related information from the identified second plurality of computing device entities and a set of entities consuming storage capacity provided by the second plurality of computing device entities;

correlating the storage-related information from the set of entities with the storage-related information from the second plurality of computing device entities to determine a mapping; and wherein forecasting storage requirements for the future time period further comprises forecasting an amount of storage capacity of the second plurality of computing device entities that will be consumed during the future time period by the set of entities.

8. The method of claim 7, further comprising displaying to the user an adjustable graph segment that represents the collected storage-related information over a past period of time.

9. The method of claim 8, further comprising receiving a user-defined length of the adjustable graph segment that defines the user-defined historical collection of the storage-related information.

10. The method of claim 9, wherein the user-selected modeling parameter comprises at least one of, for each of the second plurality of computing device entities: (i) peak collected usage data, (ii) average collected usage data, and (iii) last usage data.

11. A computer program product for forecasting electronic data storage requirements, the computer program product stored on a non-transitory computer readable storage medium and configured to cause a computer processor to execute the steps of:

determining whether to use existing control data or new control data;

if it is determined to use new control data, obtaining criteria for the new control data, at least in part by receiving a user selection of at least one of a range of internet protocol addresses and a set of host names;

if it is determined to use existing control data, providing a user options to select the existing control data to be used and to edit the existing control data in order to add or change criteria specified by the existing control data;

identifying from among a first plurality of computing device entities located on a network a second plurality of computing device entities that satisfies the user selection;

collecting with a non-invasive protocol interface storage-related information from each of the second plurality of computing device entities, wherein said collecting comprising querying each of the second plurality of computing device entities from a remote location, and wherein the storage-related information comprises information regarding disk usage, disk utilization, performance and failure rate;

upon user initiation of a forecasting operation:

when determining to use a new forecast scenario, invoking a process for creating a new forecast scenario, wherein the process comprises (1) receiving a user selection of a scope of historical data, the scope defining a set of elements, entities, or groups against which a model and resulting forecast are created, (2) obtaining modeling parameters from a user, and (3) generating a new scenario, wherein obtaining the modeling parameters comprises:

receiving a user selection of a data aggregation, wherein receiving the user selection includes presenting to the user a choice of at least the following data aggregations: (1) peak collected usage and utilization data for the current day, (2) average collected usage and utilization data for the current day, (3) last usage and utilization data for the current day, and (4) standard deviation from average, for usage and utilization data, for the current day;

receiving a user selection of a view to apply to the chosen groups, entities, or elements, wherein receiving the user selection includes presenting to the user a choice of at least generating a model for each individual member of the group or generating a model based on a rollup of the group data;

receiving a user selection of a historical time period including a starting date and an ending date;

receiving a user selection of a data series type to analyze, wherein receiving the user selection includes presenting to the user a choice of at least the following data series types: (1) usage, (2) utilization as a percentage of available storage, (3) costs, (4) power consumption, (5) performance, and (6) failure rates;

receiving a user selection of a confidence level and risk factors; and receiving a user selection of a model methodology, wherein receiving the user selection includes presenting to the user a choice of at least one methodology using a single algorithm, at least one methodology using a tournament, and at least one methodology using multiple algorithms;

when determining to use an existing forecast scenario, outputting a list of available scenarios for analyzing the collected storage-related information and receiving a user-selected scenario from the list of available scenarios;

forecasting, based on the new scenario or the user-selected scenario, and the collected storage-related information, storage requirements of the second plurality of computing device entities for a future time period; and outputting the forecasted storage requirements to a display.

12. The computer program product of claim 11, wherein collecting the storage-related information from each of the plurality of identified second plurality of computing device entities further comprises:

receiving criteria for the storage-related information to be collected;

collecting the storage-related information from the identified second plurality of computing device entities and a set of entities consuming storage capacity provided by the second plurality of computing device entities;

correlating the storage-related information from the set of entities with the storage-related information from the second plurality of computing device entities to determine a mapping; and wherein forecasting storage requirements for the future time period further comprises forecasting an amount of storage capacity of the second plurality of computing device entities that will be consumed during the future time period by the set of entities.

13. The computer program product of claim 11, wherein said collecting is performed without installation or persistent residence of a process dedicated to a collection task on any of the second plurality of computing device entities.

14. The computer program product of claim 11, wherein the second plurality of computing device entities comprises different types of storage entities.

* * * * *